United States Patent [19]

Amicel et al.

[11] 4,224,094
[45] Sep. 23, 1980

[54] METHOD AND APPARATUS FOR SIMULTANEOUS PRODUCTION OF PLURAL HOLLOW FIBER DEVICES BY WINDING

[75] Inventors: Charles Amicel, Carrieres sur Seine; Bernard Biot, Craponne; Yves Butruille, Ferrolles-Attilly; Christian Ollivier, Vienne, all of France

[73] Assignee: Rhone-Poulenc Industries, Paris, France

[21] Appl. No.: 969,848

[22] Filed: Dec. 15, 1978

Related U.S. Application Data

[63] Continuation of Ser. No. 791,023, Apr. 26, 1977, abandoned.

[51] Int. Cl.[2] .......................................... B65H 81/00
[52] U.S. Cl. .................................... 156/169; 156/175; 156/296; 156/433; 156/443; 210/321 R
[58] Field of Search ............... 156/169, 175, 173, 174, 156/177, 180, 296, 434, 426, 439, 427, 443, 425, 446, 250, 441, 433, 510; 210/321 R, 321 B, 321 A; 28/101, 102; 242/7.02

[56] References Cited

U.S. PATENT DOCUMENTS

| 1,195,949 | 8/1916 | Carney | 156/172 |
|---|---|---|---|
| 2,954,816 | 10/1960 | Havemann | 156/177 |
| 3,422,511 | 1/1969 | Seguin | 156/439 |
| 3,442,002 | 5/1969 | Geary, Jr. et al. | 210/321 R |
| 3,467,507 | 9/1969 | Andreevkaya et al. | 156/174 |
| 3,690,465 | 9/1972 | McGinnis et al. | 210/321 R |
| 3,755,034 | 8/1973 | Mahon et al. | 156/169 |
| 3,801,401 | 4/1974 | Cope et al. | 156/439 |
| 4,038,190 | 7/1977 | Baudet et al. | 210/321 R |

FOREIGN PATENT DOCUMENTS

2304839 8/1973 Fed. Rep. of Germany .

Primary Examiner—Michael W. Ball
Attorney, Agent, or Firm—Gerald D. Sharkin; Robert S. Honor; Walter F. Jewell

[57] ABSTRACT

A process and apparatus are disclosed for the simultaneous preparation of several hollow fiber devices especially useful for fluid fractionation operations, wherein at least one hollow fiber is wound around means, at least three in number, located in different planes thereby obtaining with this fiber an envelope having a polygonal section, which can be cut in at least two places as it is formed, so as to obtain at least two distinct groups of hollow fiber lengths. Various specific embodiments are described.

15 Claims, 11 Drawing Figures

METHOD AND APPARATUS FOR SIMULTANEOUS PRODUCTION OF PLURAL HOLLOW FIBER DEVICES BY WINDING

This is a continuation of Ser. No. 791,023, filed Apr. 26, 1977, now abandoned.

The present invention relates to a process and apparatus for the manufacture of hollow fiber devices, which are especially useful for fluid fractionation operations.

The process according to the present invention makes possible the production of hollow fiber devices in which the fiber lengths are arranged between two end walls which are spaced apart from one another, in different planes, and contain, especially, glue. These hollow fiber lengths run from one end wall to the other. However, these hollow fiber lengths are not necessarily parallel to one another and in certain cases these lengths may be advantageously arranged in the form of a multiplicity of twisted elements, one beside the other. In a preferred embodiment of a device according to the present invention, the hollow fiber lengths are arranged about a mandrel.

The term "fractionation", used above to indicate operations which it is possible to carry out with the hollow fiber devices obtained according to the process of the present invention, covers any exchange or transfer of material (or even of heat) where, after the said fractionation has taken place, one or several fluids are obtained which do not have the same composition or the same properties as the fluid or fluids introduced into the hollow fiber devices. The fractionation operations under consideration are therefore essentially exchange operations (dialysis, for example as in any artificial kidney, direct osmosis, gas-gas exchange and gas-liquid exchange, for example as in an artificial lung) and separation operations (ultrafiltration, reverse osmosis and gas permeation) and even mixing operations. However, the hollow fiber devices obtained according to the process of the present invention may also be used in operations such as heat exchange between two fluids, air humidification and/or air conditioning, and the dissolving of certain gases in liquids.

Prior art processes which make it possible to obtain hollow fiber devices are described especially in U.S. Pat. Nos. 3,277,959; 3,690,465; and 3,755,034.

A process and an apparatus (see FIG. 11), leading to hollow fiber devices, are described in U.S. Pat. No. 3,277,959, but this is a sequential process, that is to say it is necessary, at regular intervals, to start or to stop the movement of the hollow fiber lengths.

An apparatus is described in U.S. Pat. No. 3,690,465 for manufacturing hollow fiber devices by the continuous winding of hollow fibers about a moving carrier, this carrier being, for example, in the form of a fabric having a multitude of small perforations.

A process is described in U.S. Pat. No. 3,755,034 for obtaining a bundle of hollow fibers, wherein hollow fibers are continuously wound about two moving carriers which are at a distance from one another and substantially parallel to each other.

The process employed in the last two patents just mentioned suffer especially from the disadvantages resulting from the difficulty that exists in continuous high speed winding of fibers about a flat surface. Indeed, the variations in unwinding speed are considerable during the winding operation, as are the variations in tension to which the fibers are subjected. This limits the winding speed, especially if the fibers are fragile. Furthermore, these processes make it impossible, or at best possible only with difficulty, to operate in such a way that the tension of the fibers is substantially zero during the operation of winding on to the mandrel and during the manufacture of the end walls. This substantially zero tension has the advantage of avoiding the subsequent retraction of the fibers, especially during the hardening of the glue. In addition, the apparatus described for carrying out the processes of these last two U.S. patents have the disadvantage of being bulky.

A process which does not suffer from the aforesaid and other disadvantages of the processes of the prior art has now been found, and it is this which is the subject of the present invention. This process for the manufacture of hollow fiber devices is characterized in that at least one hollow fiber is wound around means which make it possible to produce with this fiber an envelope with a polygonal section, and in that this envelope is cut in at least two places so as to obtain at least two distinct groups of hollow fiber lengths.

The present invention also relates to apparatus for carrying out the aforesaid process.

It is of course understood that, in the present application, by the term hollow fibers is meant fibers with a tubular form, that is to say having inside them, a continuous passage arranged substantially along the axis of the fiber.

The hollow fibers used according to this invention may be of any known type and may be made of any suitable material, expecially natural, artificial or synthetic macromolecular materials, and including glass.

In particular, they may be the fibers mentioned in French Pat. Nos. 1,307,979; 1,586,563; 2,017,387; and U.S. Pat. No. 3,674,628; these fibers may be homogeneous, microporous or anisotropic (that is to say having a skin). They may be obtained by a melt process, a dry process (solvent evaporation), or a wet process (coagulation). The precise nature of the hollow fibers is chosen as a function of the application under consideration and naturally for simple heat exchange operations the hollow fibers used will be impermeable to the fluids circulating over their outer or inner walls and are made of materials such as those described especially in U.S. Pat. No. 3,315,740.

The starting fibers used according to this invention have an outer diameter generally less than 1.5 mm and preferably less than 0.75 mm, and generally greater than 5 microns and preferably greater than 300 microns, for devices used as artificial kidneys or artificial lungs. Their wall thickness is generally between 1 and 100 microns. The starting fibers are essentially continuous.

The description of the present invention will be still better understood by reference to the accompanying drawings which illustrate schematically, by way of non-limiting examples and without any special scale, particular embodiments of apparatus that make it possible to readily carry out the process claimed.

Throughout the description which follows an envelope with a polygonal section in particular will be referred to, which is obtained from hollow fibers wound about means to be explained in more detail hereinafter. It should be mentioned that this envelope can be likened to a tube with a polygonal section, the height of which is greater or lesser depending on the apparatus used. It should also be mentioned that certain sides of this polygonal envelope may not be rectilinear and that in certain cases they may be curvilinear.

Figure 1:
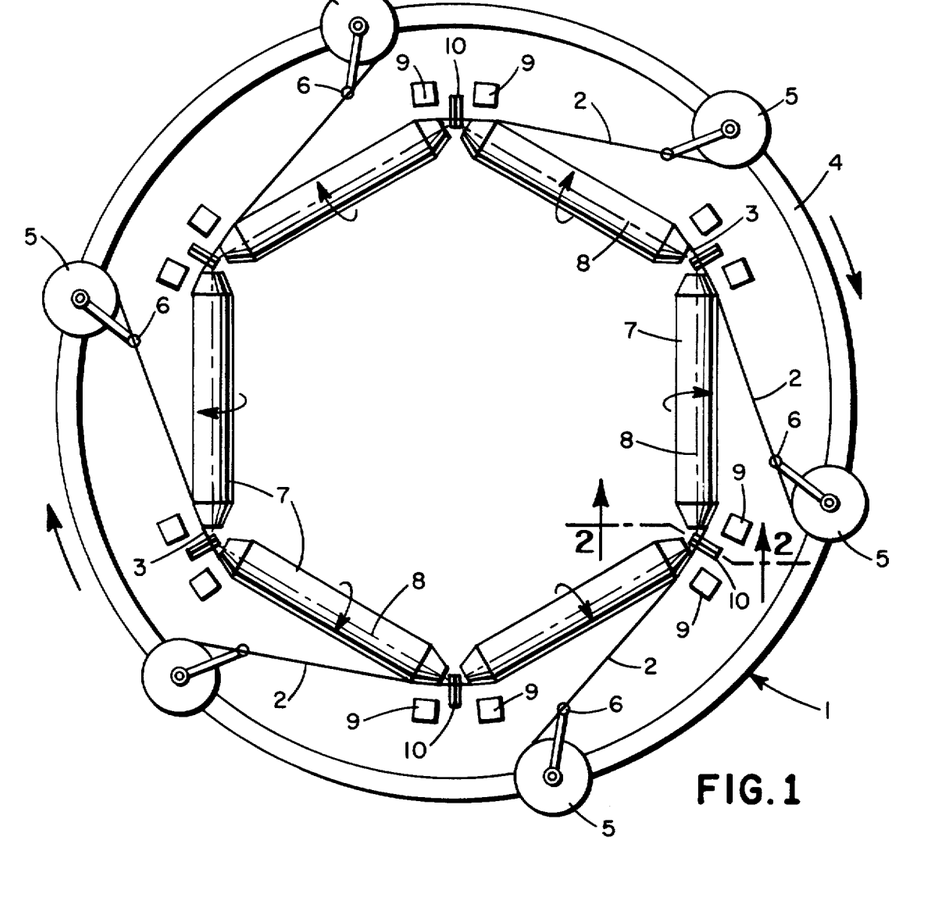
FIG. 1 is a view from above of an apparatus which makes it possible to arrange at least one hollow fiber directly by winding about fixed mandrels which rotate about their axes.

The apparatus shown in FIG. 1 comprises a device 1 for winding at least one hollow fiber 2 about means which make it possible to obtain, with this fiber, an envelope 3 with a polygonal section. The device 1 is driven in rotation by known means, not shown, and comprises especially a frame 4 on which are located six bobbins 5 of hollow fibers 2 and yarn guides 6. It is not essential for the bobbins 5 to be six in number and in the limiting case the apparatus may have only one bobbin 5. A bobbin 5 may have one or several hollow fibers 2 and in this latter case these are advantageously in the form of twisted elements such as those described in French Patent Applications Nos. 73 20,040 and 74 11,674.

The means which make it possible to obtain, with the fibers 2, an envelope 3 with a polygonal section comprise mandrels 7 which rotate about their axes 8 by virtue of drive means, not shown.

In the case of the apparatus of FIG. 1, there are six mandrels 7, although it is sufficient that there be at least two mandrels 7 to obtain the envelope 3 with a polygonal section. In this case the two mandrels 7 have their axes 8 substantially in the same plane which is at right angles to the winding axis of the starting hollow fiber, that is to say to the axis of rotation of the frame 4, the two mandrels 7 being a certain distance apart and their axes being substantially parallel to one another.

However, the number of mandrels 7 is advantageously equal to or greater than three. The mandrels 7 may or may not have their central portion connected to their outer surface. If the mandrels 7 have their central portion connected to their outer surface, this may be carried out, especially, by providing, in each mandrel 7, a longitudinal central passage connected by small pipes to the outer surface of the mandrel. The mandrel may even be a perforated tube. The cross-section of a mandrel 7 may be of any form, but advantageously it is circular. The outer form of the mandrel may be such that its generatrices are not rectilinear, and in certain cases the latter may even be curvilinear.

The apparatus according to FIG. 1 comprises means for locally applying an adhesive material, for example glue, on to the hollow fiber 2 and thus of ensuring the holding of the polygonal envelope 3 at the ends of each mandrel 7. In the case of the apparatus of FIG. 1, these means comprise fixed blocks 9 which distribute glue and over which each fiber 2 slides and picks up glue as it is deposited by winding about the mandrels 7.

There is at least one glue-distributing block 9 corresponding to each end of each mandrel 7. Thus each hollow fiber 2 which is supplied from a bobbin 5 is held by the glue at the ends of each mandrel 7, which rotates about itself, and the fibers deposited on the mandrels 7 constitute an envelope with a polygonal section. In the case of the apparatus of FIG. 1, the envelope 3 has a section having substantially the form of a regular hexagon.

The apparatus according to FIG. 1 comprises means 10 for cutting the envelope 3 into sections, at least between the ends of two consecutive mandrels 7; these means comprise, for example, two adjacent toothed blades, at least one of which has a reciprocating movement like the relative movement of the blades of hairdressers' clippers. These cutting means 10 may also consist of rotating circular blades. The operation of cutting the envelope 3 of hollow fibers 2 by the blades 10 leads to groups 11 of hollow fiber lengths 12 being obtained, each group 11 being held at the ends of a mandrel 7 by the glue and moving in rotation with the mandrel.

Figure 2:
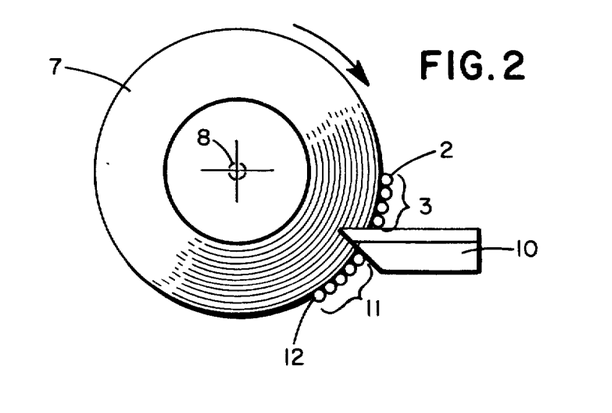
FIG. 2 is a partial view, in cross-section along II—II of FIG. 1, on a larger scale.

FIG. 2 shows, on a larger scale, the positioning of the means 10 which makes it possible to cut the envelope 3 into sections, relative to the axis 8 of a mandrel 7, and also shows a group 11 of hollow fiber lengths 12 at the start of the operation of cutting the envelope 3 into sections.

In the apparatus shown in FIGS. 1 and 2, the axes 8 of the mandrels 7 are in the same plane and it is advantageous for the hollow fibers 2 to be deposited about each mandrel in substantially the same plane as that passing through the axes 8 of the mandrels 7.

Numerous variants of the apparatus shown in FIGS. 1 and 2 will be apparent to the technical expert. Thus, instead of holding the envelope 3 on each mandrel 7 by passing the fibers 2 over glue-distributing blocks 9, it is possible, for example, to provide nozzles for the distribution of glue close to the ends of each mandrel 7. It is also possible to wind yarns on tapes at the ends of each mandrel 7, at right angles to their axes 8, to give a better mechanical strength to the end walls and/or a better distribution of the fluid flowing over the outer wall of the fibers. Optionally, the glue may be pre-distributed on these yarns or tapes in the same way as that described below for the apparatus of FIGS. 3 to 7.

The apparatus according to FIGS. 1 and 2 may comprise additional means (not shown) for winding yarns or tapes, spaced apart from one another about each mandrel between its ends and at right angles to its axis. Thus the hollow fibers 2 which form the envelope 3 having a polygonal cross-section are deposited on these yarns or tapes which facilitate the distribution and the flow of the fluid on the outside of the fibers in the final hollow fiber device, especially when these fibers are not in the form of twisted elements.

Optionally, one side of the envelope 3 of hollow fibers 2, which envelope has a polygonal section, may be obtained using two or more mandrels 7, the axes 8 of which are an extension of one another, that is to say they are aligned. In this case it is necessary to provide means for holding the envelope 3 on each mandrel and for cutting the envelope between each mandrel.

The glues used for carrying out the process with the apparatus represented in FIGS. 1 and 2, and with those described below, are generally epoxy glues such as those described, for example, in French Pat. Nos. 2,126,208 and 1,307,979, or other adhesives based on silicone resins or polyurethanes.

To carry out the process according to the present invention with the apparatus of FIG. 1, the operation is begun by fixing each hollow fiber 2, from a bobbin 5, close to one end of a mandrel 7, after passing each fiber 2 through the corresponding yarn guide 6. The same operation is carried out for each bobbin 5. When the blocks 9 are ready to distribute their glue, the frame 4 and the mandrels 7 are then rotated about their respective axes, the cutting means 10 also being put into operation. When the thickness (or the number) of hollow fiber lengths 12 about the mandrels 7 is judged to be sufficient, the rotation of the frame 4 and of the mandrels 7 is stopped. Each hollow fiber is cut close to the yarn guide 6 through which it passes, and the cut portion of this fiber connected to one end of the mandrel is discarded. Assemblies are thus obtained, each resulting from a group 11 of hollow fiber lengths 12. To manufacture devices which can be used for the fractionation of fluids, it only remains to arrange a chamber and suitable nozzles about each assembly as obtained above.

Figures 3, 4:
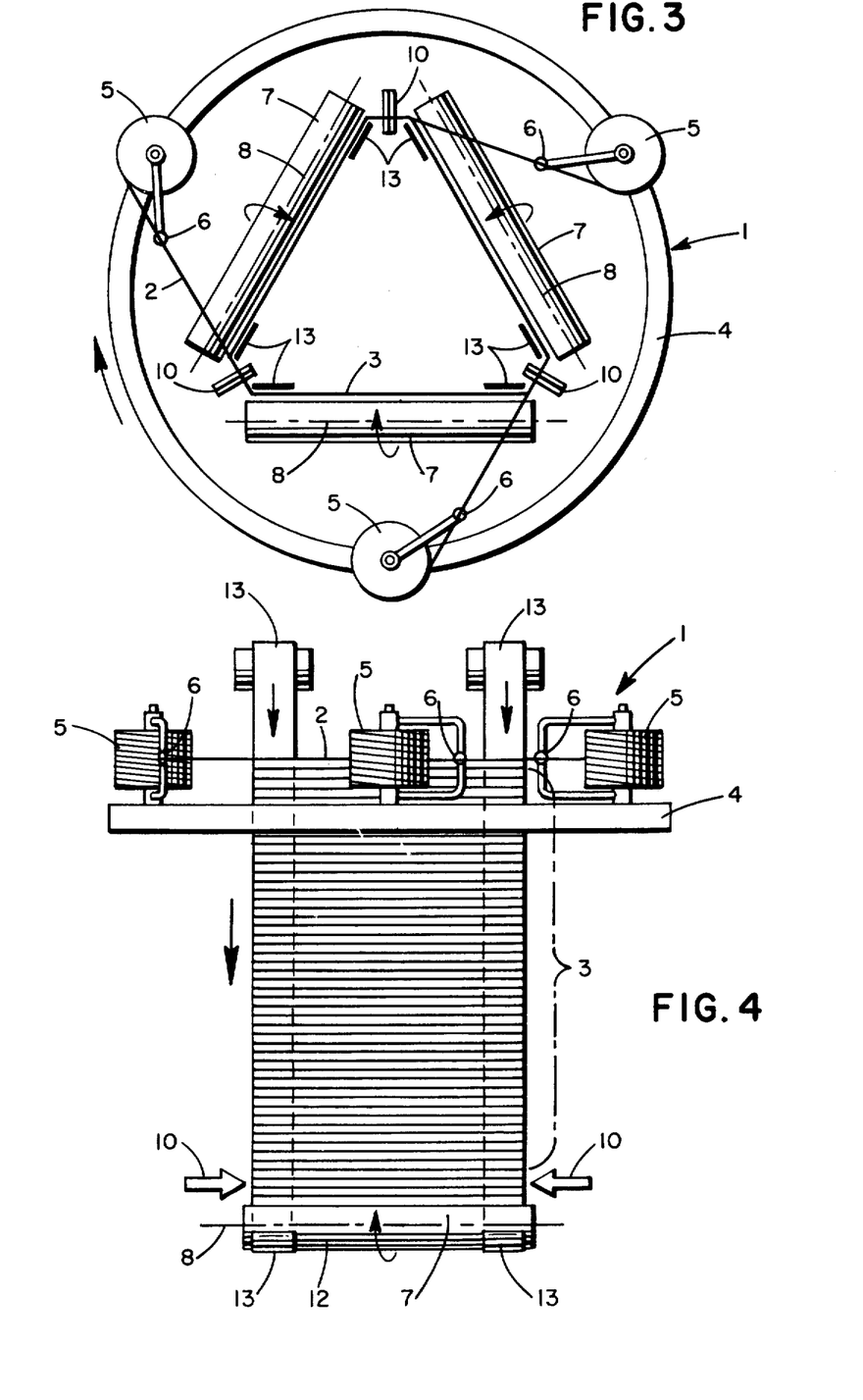
FIG. 3 is a view from above of another embodiment of an apparatus for carrying out the process.
FIG. 4 is a partial front view of the apparatus of FIG. 3.
Figure 5:
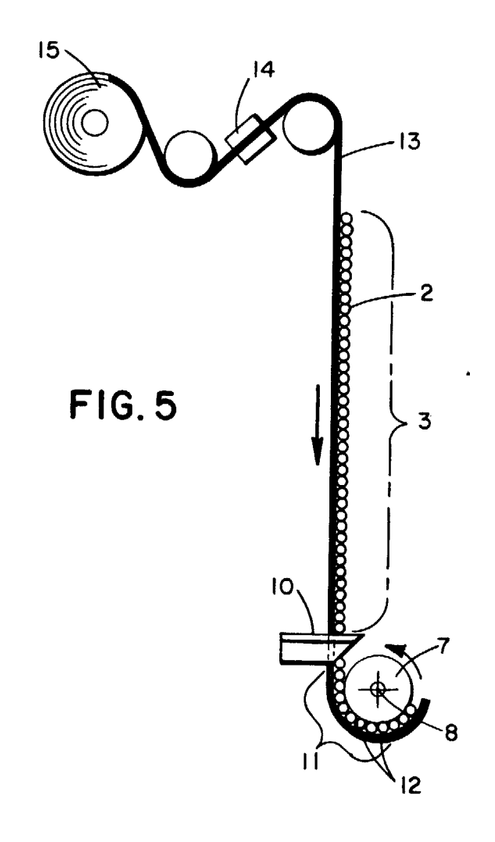
FIG. 5 is a partial view from the left of the apparatus of FIG. 4.

FIGS. 3 to 5 show another embodiment of an apparatus which makes it possible to carry out the process according to the present invention, in which at least one hollow fiber 2 is wound about means which make it possible to obtain, with this fiber, an envelope 3 with a polygonal section. In this apparatus the hollow fiber 2 is wound about yarns or tapes 13 arranged so that an envelope 3 with a polygonal section is obtained.

To wind the fiber 2 about these yarns or tapes 13, the apparatus comprises a winding device 1 with, especially, a rotatable frame 4 on which are located three supply bobbins 5 of hollow fibers 2, and yarn guides 6, the frame 4 being rotated about its central vertical axis by conventional means not shown.

It is not essential that the bobbins 5 be three in number, and in the limiting case the frame 4 may have only a single bobbin 5. The yarns or tapes 13 are of small thickness, generally between 0.05 and 2 mm and preferably between 0.1 and 1 mm. The width of the tapes is generally less than 5 cm and preferably less than 3 cm. These yarns or tapes 13 may be made of synthetic materials such as polyamides and polyesters, or of natural materials such as, for example, cotton. The tapes may be braided, knitted, woven or non-woven, and may have a multitude of small holes.

Each bobbin 5 comprises at least one hollow fiber 2 although, optionally, it may have several of these and in such case the fibers are advantageously in the form of twisted elements.

The apparatus shown in FIGS. 3 to 5 comprises three mandrels 7, to the ends of each of which a tape is fixed, for example, by glueing or by stapling. These mandrels can be rotated about their axes 8 by known means not shown. It is advantageous for the axes 8 of the various mandrels to be in the same plane. These mandrels are arranged so that their axes between them form a polygon, which is preferably regular; thus the hollow fibers 2 which are deposited on these tapes 13 as the frame 4 rotates about the tapes form an envelope 3 having a polygonal section, one side of which is shown in FIG. 4.

In the case of the apparatus shown in FIGS. 3 to 5 the number of mandrels 7 is three, but this number may advantageously be greater than three. When the frame 4 rotates about its axis, the hollow fibers 2 are wound about the tapes 13 which are themselves guided to the mandrels 7 in order to wind about the latter.

The apparatus comprises means for holding the envelope 3 and this is generally effected by depositing glue on the yarns or tapes 13.

The apparatus thus comprises a glue-distributing nozzle, numbered 14 in FIG. 5, in which, as in FIGS. 3 and 4, the tapes 13 are represented by a bold (heavier) line. Each tape 13 comes from a tape bobbin 15 and, optionally, the tape may be coated with glue on only part of its width, for example on the side which is necessarily located close to the end of the mandrel. The glues or adhesives used may be of the same type as those mentioned above for the apparatus shown in FIGS. 1 and 2.

Optionally, each tape 13 may be covered by an adhesive product, for example glue, over part of its width, whilst on the other part it may be covered by a different product having specific desired properties such as, for example, a better compatibility with blood. A per se conventional blood-compatible silicone may be mentioned by way of example.

The apparatus comprises, in addition, means 10 for cutting the envelope 3 into sections before winding on to the mandrels 7. These means 10 can be like those described above for the apparatus in FIGS. 1 and 2. In the case of the apparatus in FIGS. 3 to 5, three groups 11 of hollow fiber lengths 12 are obtained, each group 11 being wound about a mandrel 7 by virtue of the tapes 13.

To carry out the process according to the present invention with the apparatus shown in FIGS. 3 to 5, the procedure is as follows: The operation is begun by fixing each tape 13 to the ends of the mandrels after having coated the tape with glue by passing over the glue-distributing nozzle 14. Each fiber end 2 passing through the yarn guide 6 associated with the bobbin 5 is fixed on to a tape 13 and the frame 4 and the mandrels 7 are caused to move in rotation about their respective axes. The hollow fibers 2 are thus deposited on the tapes 13 and an envelope 3 of hollow fibers is obtained with a polygonal section, and in this precise case with a triangular section.

The envelope 3, supported by the strips 13, thus moves towards the mandrels 7, and then is cut, in passing, by the means 10 of cutting into sections, when it comes into contact with them. Three groups 11 of hollow fiber lengths 12 are thus obtained and each group is wound about a mandrel 7. When the thickness (or the number) of hollow fiber lengths about a mandrel 7 is judged sufficient, the tapes 13 are cut and the winding is continued on another mandrel 7.

Optionally, it is possible to stop the unwinding of the tapes 13 and the rotation of the frame 4 in order to change the mandrels 7. For the manufacture of devices which are useful for the fractionation of fluids, it only remains to arrange a chamber and suitable nozzles for flow of fluids about each assembly as thus obtained.

Numerous variants of the apparatus shown in FIGS. 3 to 5 are within the scope of the invention. For example, it is possible to wind each group 11 of hollow fiber lengths 12 not about a mandrel 7, but rather simply about an axis substantially orthogonal to the winding axis of the initial hollow fiber which was used to form the envelope 3. It is possible to have, for this purpose, a little roller of small diameter, which rotates about its axis and on to which a tape 13 winds, in the location corresponding to each end of the mandrel used above. A small roller, such as the one just mentioned, is required for each tape 13 and an assembly of hollow fiber lengths 12 is thus obtained without a central mandrel 7.

It is also possible to provide yarns or tapes spaced apart from one another, between the end yarns or end tapes 13, and on to which the fibers 2 are deposited when the frame 4 rotates. These intermediate yarns or tapes may provide a still better distribution and a still better flow for the fluid flowing on the outside of the fibers in the final hollow fiber device.

As another variant of the apparatus in FIGS. 3 to 5, an apparatus according to the present invention may have tapes 13 which are not provided with adhesive material and about which the envelope 3 is maintained solely by the winding tension of the fiber deposited about these tapes 13. In this case, the tapes 13 can be brought substantially nearer to one another whilst coming closer to the mandrel and thus can contribute to the relaxation of the fiber before the operation of winding same about the mandrel. To facilitate this feature of bringing the tapes 13 nearer to each other and to ensure a proper winding of the tapes at the ends of the mandrels 7, it is possible to provide pulleys (not shown) which are located at each end of the envelope 3, which has a polygonal section, close to the mandrels 7, the groove of each pulley being in contact with one end of the envelope, that is to say with two adjacent tapes 13. In this apparatus the envelope 3 is wound about each mandrel 7 and is held on the mandrels solely by the tapes 13. As soon as the envelope 3 has passed the tangential point of a mandrel 7 it is then possible to cut the said envelope using the means 10, since the envelope is held between the mandrel 7 and the tapes 13. This embodiment is of value in the case where the end walls of each hollow fiber device are manufactured, for example, by subsequently injecting glue. On the other hand, it may be desirable not to wind each group 11 of hollow fiber lengths 12 about an axis or about a mandrel, and instead to fold each group 11 in the form of a zig-zag using known means, for example, for the manufacture of apparatus having flat membranes arranged in the form of a zig-zag. The hollow fiber devices are thus obtained starting from superimposed flat layers of hollow fiber lengths 12.

The apparatus as shown in FIGS. 3 to 5 comprises a frame 4 and mandrels 7, which are fixed but rotate about themselves, the yarns or tapes 13, by moving, thus driving the envelope 3. However, it is possible, without departing from the spirit of the present invention, for the envelope 3 to be fixed and thus to be obtained by depositing hollow fibers 2 on yarns or tapes 13, which do not move, whilst the frame 4 and the mandrels 7, by rotating, are subjected also to a translational movement. In this case the means 10 for cutting the envelope into sections also move, at a certain distance from the mandrels. Thus, in this embodiment the frame 4, the mandrels 7, and the means 10 for cutting the envelope 3 into sections all move in the same direction.

With the apparatus of FIGS. 3 to 5 and the apparatus described in the variants mentioned above, it is possible that one side of the envelope of hollow fibers may, in fact, give two (or more than two) hollow fiber devices, for example when two (or more than two) mandrels are arranged with their axes in alignment.

Figure 6:
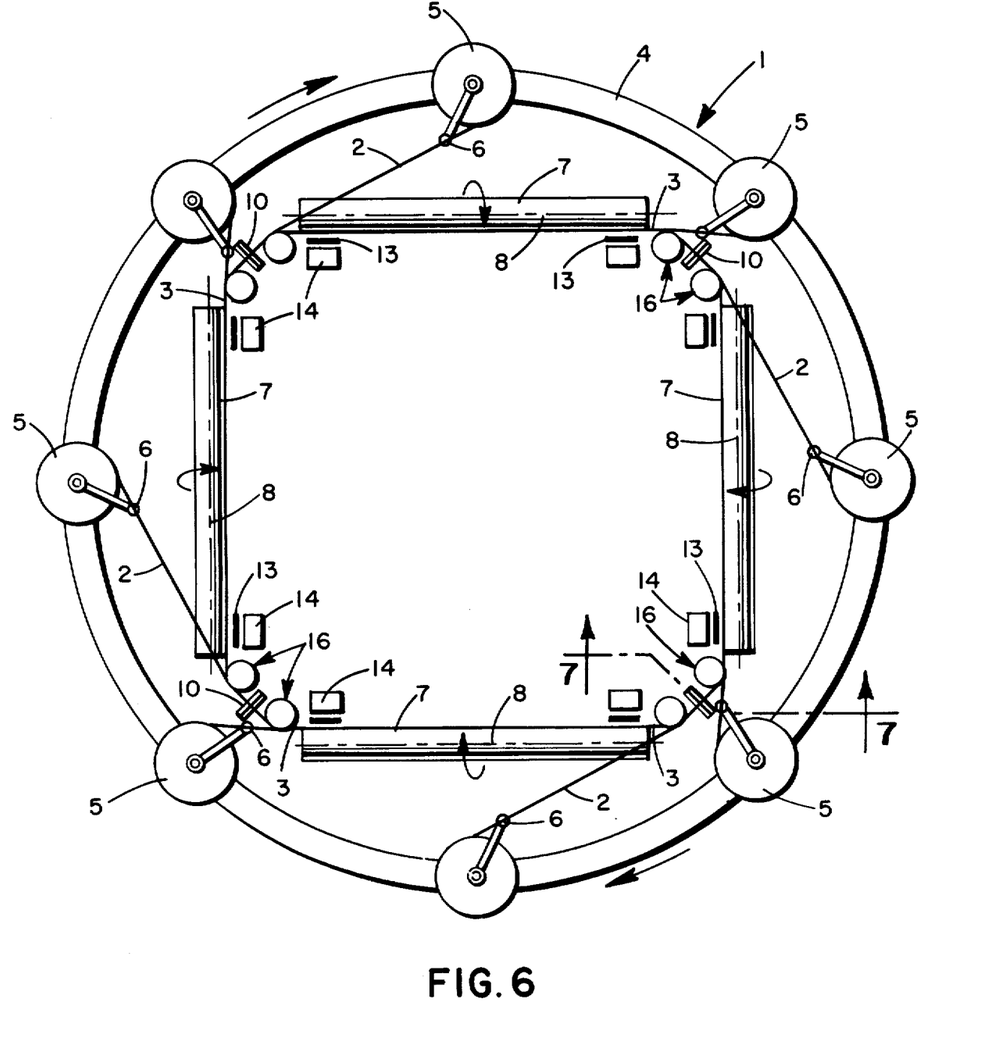
FIG. 6 is a view from above of another embodiment of an apparatus which makes it possible to carry out the process according to the present invention.
Figure 7:
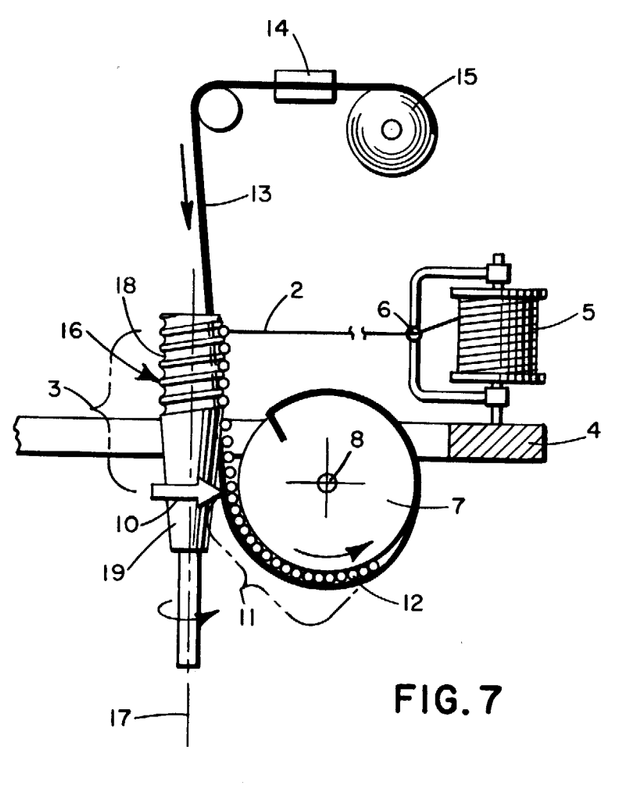
FIG. 7 is a partial view, on a larger scale, along VII—VII of FIG. 6.
Figure 8:
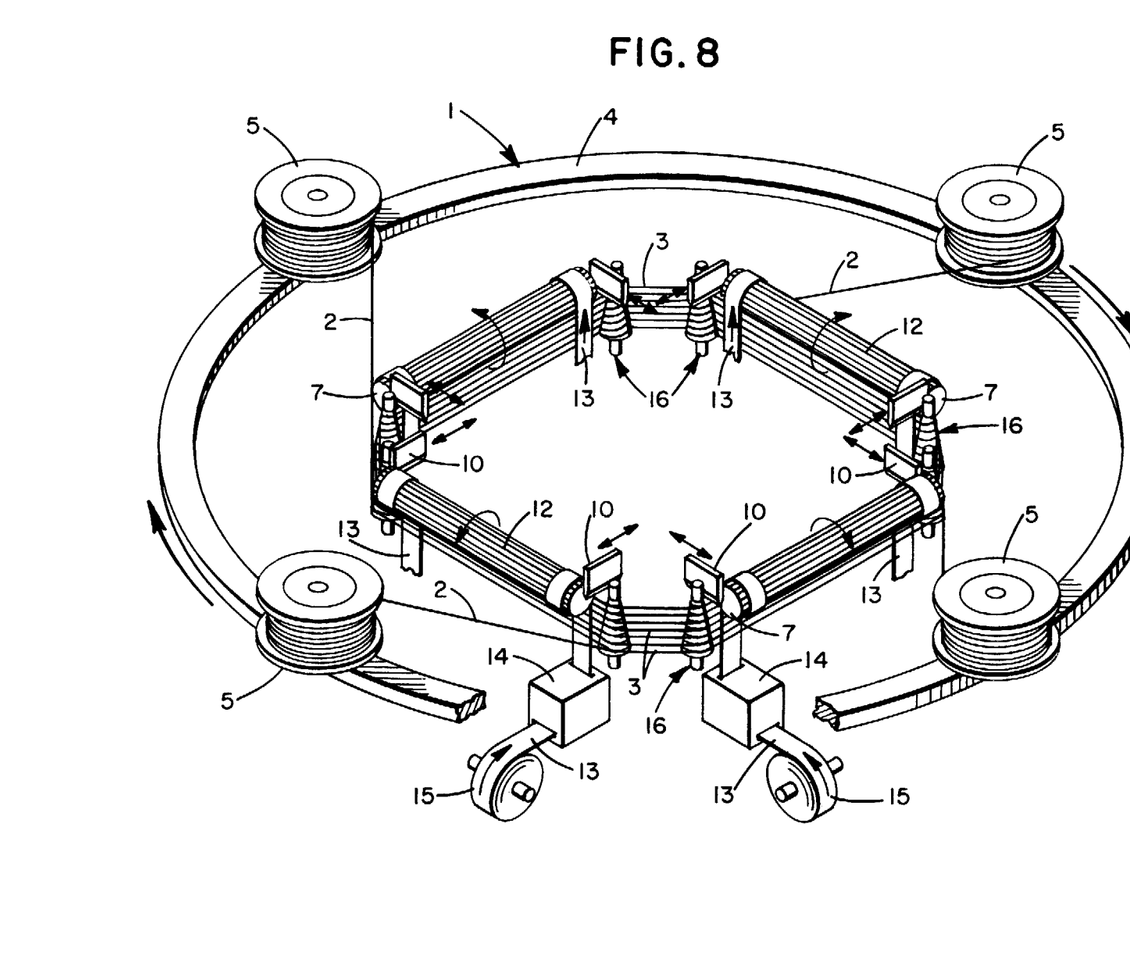
FIG. 8 is a perspective view of an apparatus like that of FIGS. 6 and 7.

The apparatus shown in FIGS. 6 to 8 corresponds to a preferred embodiment of an apparatus for carrying out the process according to the present invention. This apparatus comprises a device 1 for winding at least one hollow fiber 2 about means which make it possible to obtain, with this fiber, an envelope 3 having a polygonal section. This device 1 comprises a frame 4 which rotates about its central vertical axis, with bobbins 5 of hollow fibers 2 and yarn guides 6. In order to simplify the drawing, the means for driving this frame 4 have not been shown. Each bobbin 5 has at least one hollow fiber 2 and may, optionally, have several thereof; in the latter case these fibers are then advantageously twisted. The frame 4 is shown (FIG. 6) with eight bobbins 5, but in the limiting case it is possible to have only one or two thereof. In the case of FIG. 8, the apparatus has only four bobbins 5.

The means which make it possible to obtain with the fibers 2 an envelope 3 having a polygonal section comprise rods 16 which are at least partially threaded, located at each end of the mandrels 7, and on the threaded part of which are arranged the hollow fibers 2. These rods 16 can rotate about themselves, about their longitudinal axis 17, by virtue of conventional drive means not shown. The rods 16 shown in FIGS. 6 and 7 comprise a cylindrical threaded portion 18 followed by a smooth and conical portion 19, whilst those 16 in FIG. 8 comprise a conical threaded portion followed by a cylindrical smooth portion. The apparatus shown in FIG. 6 or FIG. 8 comprises eight rods 16 and four mandrels 7, which makes it possible to obtain an envelope 3, the section of which is substantially square, with the hollow fibers 2 deposited on the rods 16. However, the number of mandrels may be greater and it is, at the minimum, equal to three; in this latter case the axes 8 of the three mandrels 7 advantageously form, between themselves, an equilateral triangle and the section of the envelope 3 is thus substantially a triangle. In the apparatus shown in FIGS. 6 and 8, the axes 8 of the mandrels 7 are in the same plane which is at right angles to the axis of rotation of the frame 4. The forms of the mandrels 7 can be like those indicated in the description of the apparatuses corresponding to FIGS. 1 and 2.

The apparatus according to FIGS. 6 to 8 comprises means for holding the envelope 3 before cutting it into sections. These means are tapes 13 represented by bold (heavier) lines in FIGS. 6 and 7. These tapes are of the same material and have the same dimensions as those already mentioned in the description of the apparatus in FIGS. 3 to 5. These tapes 13 which are coated with adhesive material on at least part of their width by passing through the glue-distributing nozzles 14, advantageously come into contact with the fiber 2 of the envelope 3 close to the tangential point of the envelope 3 and the mandrel 7. Before reaching this tangential point, it is possible for the envelope 3 to become relaxed, by virtue of the profile of the rods 16. The fact that the fibers are relaxed offers the advantage of avoiding the subsequent retraction of the hollow fiber lengths 12 in the end walls of the device thus obtained. In order to maintain the tangential point between the envelope 3 and each mandrel 7, which rotates about its longitudinal axis and becomes covered with hollow fiber lengths 12 (as described below), always substantially at the same place, the apparatus may comprise means, not shown, either for moving the mandrel 7, in a controlled manner, away from the rods 16, which are in that case fixed, or, on the contrary, to move the rods 16, in a controlled manner, away from the mandrels 7, which are in that case fixed.

The apparatus of FIGS. 6 to 8 comprises means 10 for cutting the envelope 3 of hollow fibers into sections. These means 10, whose location on the apparatus of FIGS. 6 and 7 is shown schematically by means of an arrow, may be like those described for the apparatus of FIGS. 1 and 2. Preferably, they are positioned on the apparatus so that the envelope 3 is cut when it is held on the mandrel 7 by the tapes 13. These means 10 for cutting the envelope 3 into sections are advantageously located close to the tangential point of the mandrel 7 and of the envelope 3. Thus a group 11 of hollow fiber lengths 12, which is wound about a mandrel 7, is obtained between each means 10 for cutting the envelope 3 into sections. In the case of the apparatus of FIGS. 6 to 8, four groups 11 of hollow fiber lengths 12 are obtained after cutting the envelope 3 into sections. In the apparatus shown in FIG. 8, the means 10 for cutting the envelope 3 into sections are located between each mandrel end and the adjacent rod 16.

The following procedure is used for carrying out the process according to the present invention with the apparatus of FIGS. 6 to 8:

Each tape 13 is fixed to an end of a mandrel 7, after passing through a glue-distributing nozzle 14.

The end of each hollow fiber 2 supplied from a bobbin 5 is fixed on a tape 13 or to a rod 16 after this fiber 2 has passed through the yarn guide 6 of the bobbin 5.

The mandrels 7, the frame 4, and the rods 16 are caused to rotate about their axes and the cutting means 10 are actuated.

When the envelope 3 of hollow fibers 2 comes into contact with the cutting means 10, four groups 11 of hollow fiber lengths 12 are obtained, each of which is wound about the corresponding mandrel 7.

The tapes 13 are cut when the thickness (or the number) of hollow fiber lengths about a mandrel is judged to be sufficient. Thereafter it is possible to begin again in the same way by placing another mandrel in the same location on the apparatus.

The apparatus shown in FIGS. 6 to 8 exhibits numerous advantages. In addition to making it possible to wind hollow fiber lengths 12, which have no tension, or very little tension (as indicated above), about each mandrel 7, the apparatus also makes it possible to vary, at will and independently of one another, the rotational speeds of the frame 4, the rods 16, and the mandrels 7. This is particularly important and advantageous, especially at the end of the operation of winding the hollow fiber lengths 12 about a mandrel 7. Thus it is possible to reduce to the maximum the rotational speeds of the frame 4 and of the rods 16 and to increase the rotational speed of the mandrels 7 in order to terminate the winding operation with some turns of tapes 13 without fiber lengths 12. This apparatus also readily lends itself to advanced automation, making it possible to program the rotational speeds of the frame 4, the rods 16, and the mandrels 7, it being possible even for the mandrel to be changed automatically. It must be understood, that in the embodiment of the apparatus at present being described for carrying out the process according to the present invention, at least one of the rods is shaped or is positioned in such a way that the tension of the fibers of the envelope 3 can be brought under control, especially before the envelope is divided into sections by the means 10. Thus at least one rod 16 is generally conical, at least over part of its length. In addition, each rod 16 is advantageously threaded, at least on the part which directly receives the fibers 2 supplied by the bobbins 5 when the frame 4 rotates, this threaded portion, by virtue of the rotation of the rods 16 about themselves, having the role of releasing quickly the fiber which is deposited on the rod 16 and thus of avoiding overlapping of the fibers in this region. The part of the rods 16 which brings the envelope substantially into tangential contact with the mandrel, may be smooth in order to cause a juxtapositioning or a controlled overlapping of the fibers of the envelope 3 before the latter is held against the mandrel 7 by the tapes 13; in certain cases this part of the rod 16 may be threaded, if a controlled and regular spacing of the fibers of the envelope 3 is desired, before the said envelope is held, as above, by the tapes 13 against the mandrel 7. It may also be mentioned that the thread of the rods 16 is not necessarily continuous and that the thread pitch may optionally be variable from one point to another of a generatrix or between different zones of generatrices. However, it should be noted that the juxtapositioning, overlapping, or controlled spacing of the fibers of the envelope 3 are also predetermined by the chosen relationship between the linear speed of winding about the mandrels 7, the rotational speed of the rods 16 and their threaded portion, and the speed of deposition of the fibers from the bobbins 5.

Numerous variants of the apparatus described above and shown in FIGS. 6 to 8 will be apparent to technical experts. In place of having a threaded rod 16 at each end of each mandrel 7, the apparatus may have only a single rod 16 between two consecutive mandrels 7. The means 10 for cutting the envelope 3 into sections are thus located between the said rod 16 and the end of each mandrel 7.

Just as in the apparatus shown in FIGS. 1 to 5, it is also possible to wind intermediate yarns or tapes spaced apart from one another about each mandrel 7 between the end tapes 13 or yarns, with the aim of providing a better flow and a better distribution of the fluid which flows on the outside of the hollow fiber lengths in the final hollow fiber device.

Each device possessing lengths of hollow fibers can, optionally, dispense with a mandrel and for this purpose the apparatus comprises means like those already described in connection with variants of the apparatus in FIGS. 3 to 5.

It is also possible to obtain two (or more) hollow fiber devices, side by side, from the envelope 3 having a polygonal section, for example if several mandrels 7 are arranged with the axis of one along the extension of the axis of the other.

By way of a variant of an apparatus according to FIGS. 6 to 8 for carrying out the process according to the present invention, it is also possible to provide an apparatus in which the tapes 13 (or the yarns) are not covered by adhesive material and thus the apparatus can dispense with glue-distributing nozzles 14. Given that the hollow fibers of the envelope 3 can be held against each mandrel 7 by the tapes 13 (or the yarns), the presence of adhesive material during the operation of cutting into sections is not mandatory for the process. For the manufacture of the end walls of the hollow fiber device it is sufficient to proceed, subsequently, using a known injection technique.

In the apparatus shown in FIGS. 6 to 8, the yarns or tapes 13 need not, in another embodiment of the hollow fiber device, be retained about the mandrel 7. For this purpose, it is possible to cause the yarns or tapes 13 supporting the fiber lengths 12 to make, for example, a half-turn about the mandrel 7 and then to take the yarns or tapes 13 away from the side of the mandrel 7. Optionally, this makes it possible to use them again to support the fibers 2 at the start of the formation of the envelope 3 and thus one has a process in which it is always the same yarns or tapes 13 which serve to support the envelope 3. When the yarns or tapes 13 leave the mandrel it is possible to provide a coating of glue at the ends of each mandrel, for example with "hot-melt" glue.

By way of a somewhat less preferred embodiment of the apparatus of FIGS. 6 and 7, it is possible to produce an apparatus in which the rods 16 are replaced, between each mandrel end, by a system with a belt rotating about two pulleys, the hollow fibers 2 thus being deposited on one side of the belt. In this way, the envelope 3 of hollow fibers 2 is formed by the deposition of hollow fibers on one of the two sides of each belt, which belt rotates about two pulleys and is arranged at each corner of the envelope having a substantially polygonal section.

In the apparatus according to FIGS. 6 to 8, each rod 16 may, in addition, be replaced by two adjacent elements, whose movement relative to one another is analogous to the well known movement of the fabric guiding elements under the "claw foot" of a sewing machine. The hollow fibers 2 are thus deposited (by winding) on to the elements referred to above and they move forward over those elements by virtue of their relative movement with respect to one another.

Figure 9:
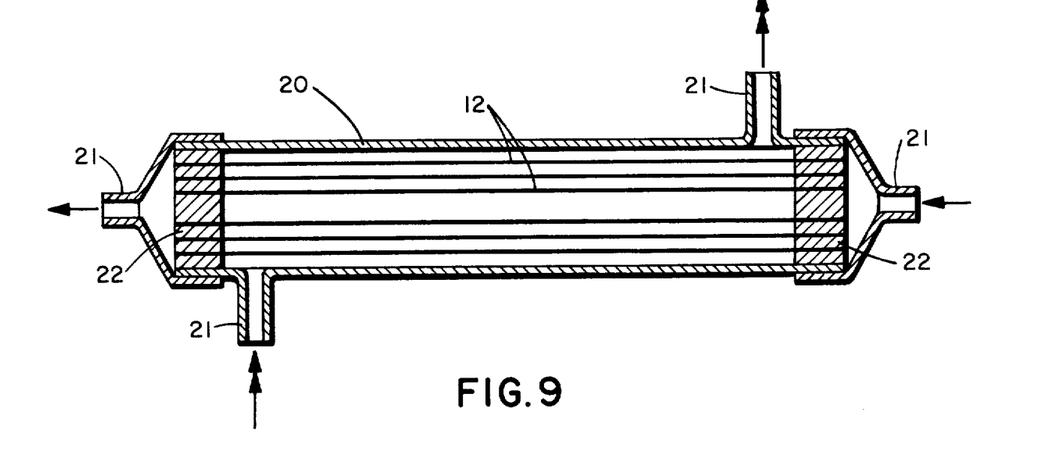
FIGS. 9, 10 and 11 show hollow fiber devices which are possible to obtain by the apparatus shown in FIGS. 1 to 8. These devices are shown schematically in cross-section along a longitudinal axis.
Figure 10:
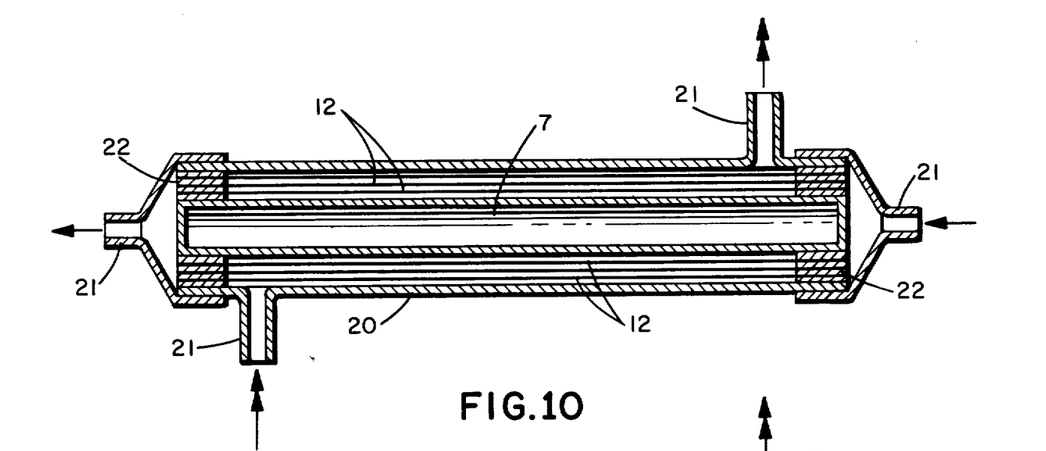
Figure 11:
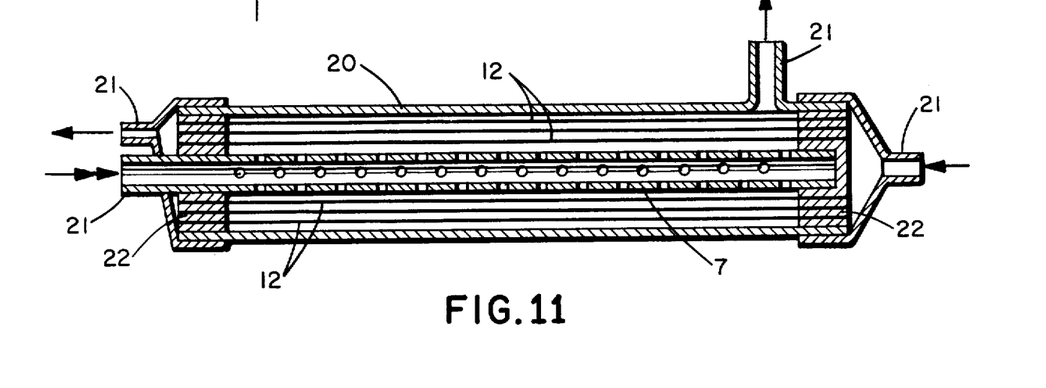

The hollow fiber devices which it is possible to obtain with the process and the apparatus according to the present invention are equipped with a chamber 20 and suitable nozzles 21 as shown in FIGS. 9, 10 and 11. This chamber 20 can be placed around the hollow fiber lengths 12 before the glue on the end walls 22 has completely hardened; in this case it may be considered that the device can no longer be dismantled, or can be dismantled only with great difficulty, since the chamber 20 is glued to the end walls 22.

In other cases, it is possible to provide leak-proofing means, such as O-rings, for example, arranged about the end walls 22 and thus allowing subsequent dismantling of the device, that is to say the easy withdrawal of the hollow fiber lengths 12 from the chamber 20. Similar devices are described, for example, in U.S. Pat. No. 3,422,008.

The devices obtained according to the process of the present invention may also have their hollow fiber lengths 12 open at each of their ends or open at only one of the ends. In the case where only one of the two ends of hollow fiber lengths 12 is open, it is possible, for example, after cutting the envelope into sections by the means 10, to close one of the ends of those lengths 12 by an application of glue.

However, for exchange operations (an artificial kidney using haemodialysis, or an artificial lung) it is necessary for the hollow fiber lengths 12 of the device to be open at each of their ends. FIGS. 9 to 11 show schematically exchange devices with four nozzles 21, two of which (those corresponding to the double-headed arrows) making circulation of a fluid possible outside the hollow fiber lengths, whilst the two other nozzles (arrows with a single head) make the circulation of a fluid possible inside the hollow fiber lengths 12.

For separation operations (reverse osmosis or ultrafiltration) the device may have only three nozzles.

The chamber 20 is generally circular in cross-section, but it can also be a parallelepiped, especially if each group 11 of hollow fiber lengths 12 is arranged in the form of a zig-zag.

What is claimed is:

1. A process for the simultaneous preparation of several hollow fiber devices especially useful for fluid fractionation operations, which comprises winding at least one hollow fiber around at least three members located in such a manner as to obtain a fiber envelope having polygonal section, advancing the fiber envelope on the at least three members, cutting the fiber envelope in at least three places during the winding of the hollow fiber and the advancing of the envelope so as to obtain at least three distinct groups of hollow fiber lengths, the hollow fiber lengths being held during the cutting of the envelope, collecting and arranging the groups so as to obtain, with each one, hollow fiber lengths firmly fixed between two end walls, the latter being in different planes and at the extremities of the hollow fiber lengths which pass through the end walls and which leave their extremities open.

2. A process according to claim 1, wherein at least one hollow fiber is wound about means so as to obtain an envelope of which the cross-section is a regular polygon.

3. A process according to claim 1, wherein the envelope is cut into sections at at least each apex of the polygon which is formed by its section, so as to obtain as many groups of hollow fiber lengths as there are apices of the envelope.

4. A process according to claim 1, wherein each group of hollow fiber lengths, obtained after cutting of the envelope, is wound about a mandrel in order to obtain with each group of hollow fiber lengths a bundle of hollow fiber lengths around a mandrel.

5. A process according to claim 1, wherein each group of hollow-fiber lengths is disposed by winding around an axis substantially orthogonal to the winding axis of the hollow fiber initially used to form the envelope, in order to obtain a bundle of hollow-fiber lengths with each group of hollow fiber lengths.

6. A process according to claim 1, which comprises winding at least one hollow fiber around at least three mandrel devices, each rotating about its longitudinal axis, arranged about the sides of a polygon to obtain a fiber envelope having a polygonal section, holding the envelope obtained at least at or near the ends of each mandrel, cutting the said envelope in at least three places, close to the ends of the mandrels, during the winding of the hollow fiber and the advancing of the said envelope on the mandrels, so as to obtain at least three distinct groups of hollow fiber lengths, collecting and arranging each group of hollow fiber lengths by winding around the corresponding mandrel in order to make a bundle around this mandrel.

7. A process according to claim 6, wherein the envelope is held in position by depositing glue on the ends of each mandrel.

8. A process according to claim 1, which comprises winding at least one hollow fiber about 2n yarns or tapes which make it possible to obtain with this fiber an envelope having a polygonal section, n being an integer equal to or greater than 3 and equal to the number of sides of the envelope making it possible to prepare a hollow-fiber device, each side of the envelope comprising at least 2 yarns or tapes, cutting the envelope in at leans n places so as to obtain at least n groups of hollow fiber lengths, each group having a yarn or tape at each of the ends of its fiber lengths, collecting and arranging the n groups so as to obtain, with each one, hollow fiber lengths firmly fixed between two end walls, the latter being in different places and at the extremities of the hollow fiber lengths which pass through the end walls and which have their extremities open.

9. A process according to claim 8, wherein each group of hollow fiber lengths, obtained after cutting of the envelope, is wound about a mandrel in order to obtain with each group of hollow fiber lengths a bundle of hollow fiber lengths around a mandrel.

10. A process according to claim 1, which comprises winding at least one hollow fiber around threaded means, at least three in number, rotating the threaded means about their longitudinal axis so that hollow fiber wound about the means is advanced in a direction substantially parallel to the threaded means, the threaded means being located in such a manner as to obtain with the fiber an envelope having a polygonal section, cutting the envelope in at least three places during its advancement on the threaded means, so as to obtain at least three distinct groups of hollow fiber lengths, holding the hollow fiber lengths of each group essentially at or near their extremities during the cutting of the envelope, and collecting and arranging each group so as to obtain, with each one, hollow fiber lengths firmly fixed between two end walls.

11. A process according to claim 10, wherein the threaded means are rods of which the position or the profile of at least one of them is such that the hollow fiber envelope relaxes during its advancement on the threaded means.

12. A process according to claim 10, wherein the hollow fiber lengths of each group obtained after cutting of the envelope are held at their extremities by yarns or tapes and are wound around a respective mandrel, at the same time as the yarns or tapes are wound around the mandrels in the vicinity of their ends, so that there are obtained simultaneously at least three mandrels with hollow fiber lengths disposed around them like a bundle.

13. An apparatus for the simultaneous preparation of several hollow fiber devices which comprises in combination:
at least three rods threaded along at least part of their lengths and located in such a manner as to obtain, when a hollow fiber is wound around them, an envelope having a polygonal shape,
means for rotating each rod about its longitudinal axis,
means for cutting the envelope in at least three places during its progress over the rotating rods,
means for arranging and collecting each group of hollow fiber lengths in order to obtain with each one, hollow fiber lengths firmly fixed between two end walls.

14. An apparatus according to claim 13, in which the means for arranging and collecting each group of hollow fiber lengths obtained after cutting of the envelope during its progress on the threaded rods are rotating mandrels, at least three in number, around each of which the hollow fiber lengths of a group are disposed in order to obtain a bundle of hollow fiber lengths around the mandrel and around each of which yarns or tapes are wound in the vicinity of their ends.

15. Apparatus according to claim 13, in which at least one of the threaded means has a positioning or a profile such as the envelope of hollow fibers relaxes during its progress on the rods.

* * * * *